(12) United States Patent
DeReimer et al.

(10) Patent No.: US 12,215,603 B2
(45) Date of Patent: Feb. 4, 2025

(54) CMC AIRFOIL WITH WISHBONE SHAPED FIBER LAYUP STRUCTURE FORMING PORTION OF PLATFORM AND ROOT

(71) Applicant: RTX CORPORATION, Farmington, CT (US)

(72) Inventors: Marcus DeReimer, Stuart, FL (US); Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/340,205

(22) Filed: Jun. 23, 2023

(65) Prior Publication Data

US 2024/0426219 A1    Dec. 26, 2024

(51) Int. Cl.
*F01D 5/28* (2006.01)
*F02C 7/00* (2006.01)

(52) U.S. Cl.
CPC ............... *F01D 5/282* (2013.01); *F02C 7/00* (2013.01); *F05D 2300/6033* (2013.01)

(58) Field of Classification Search
CPC .................................. F01D 5/282; F01D 5/284
See application file for complete search history.

(56) References Cited

U.S. PATENT DOCUMENTS

| | | | |
|---|---|---|---|
| 7,510,379 B2 | 3/2009 | Marusko et al. | |
| 9,212,560 B2 | 12/2015 | McCaffrey | |
| 9,482,108 B2 * | 11/2016 | Garcia Crespo | F01D 11/008 |
| 10,132,170 B2 | 11/2018 | Garcia-Crespo et al. | |
| 10,392,946 B2 | 8/2019 | Freeman et al. | |
| 10,443,409 B2 | 10/2019 | Sippel et al. | |
| 10,577,939 B2 | 3/2020 | Vetters et al. | |
| 11,346,228 B1 * | 5/2022 | Burdette | D03D 1/00 |

FOREIGN PATENT DOCUMENTS

| | | |
|---|---|---|
| EP | 2919955 B1 | 8/2017 |
| EP | 3315727 A1 | 5/2018 |
| EP | 3339574 A1 | 6/2018 |
| EP | 2791473 B1 | 2/2019 |
| WO | 2021034327 A1 | 2/2021 |

OTHER PUBLICATIONS

European Search Report for European Patent Application No. 24184099.0 mailed Nov. 21, 2024.

* cited by examiner

*Primary Examiner* — Michael L Sehn
(74) *Attorney, Agent, or Firm* — Carlson, Gaskey & Olds, P.C.

(57) ABSTRACT

An airfoil includes a CMC airfoil wall that defines a platform, a root that extends radially from the platform, and an airfoil section that extends radially from the platform opposite the root. The CMC airfoil wall includes a wishbone-shaped fiber layup structure. The wishbone-shaped fiber layup structure includes first and second arms that merge into a single leg. The first and second arms are comprised of a network of fiber tows, and the single leg includes fiber tows from each of the first and second arms that are interwoven in the single leg. The single leg forms a portion of the root, and the first and second arms extend in opposite directions from the single leg and form a portion of the platform.

9 Claims, 4 Drawing Sheets

CMC AIRFOIL WITH WISHBONE SHAPED FIBER LAYUP STRUCTURE FORMING PORTION OF PLATFORM AND ROOT

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes a ceramic matrix composite (CMC) airfoil wall that defines a platform, a root that extends radially from the platform, and an airfoil section that extends radially from the platform opposite the root. The CMC airfoil wall has at least one wishbone-shaped fiber layup structure. The at least one wishbone-shaped fiber layup structure has first and second arms that merge into a single leg. The first and second arms are comprised of a network of fiber tows. The single leg has fiber tows from each of the first and second arms that are interwoven in the single leg. The single leg forms a portion of the root, and the first and second arms that extend in opposite directions from the single leg and forming a portion of the platform.

In a further embodiment of any of the foregoing embodiments, the CMC airfoil wall includes radially inner and outer reinforcement fiber plies between which the second arm is disposed.

In a further embodiment of any of the foregoing embodiments, the radially inner reinforcement fiber ply terminates at the single leg.

In a further embodiment of any of the foregoing embodiments, the radially outer reinforcement fiber ply extends along a radially outer surface of the first arm.

In a further embodiment of any of the foregoing embodiments, the second arm splits into a pair of fingers, and the airfoil section extends between the pair of fingers.

An airfoil according to an example of the present disclosure includes a ceramic matrix composite (CMC) airfoil wall that defines a platform, a root that extends radially from the platform, and an airfoil section that extends radially from the platform opposite the root. The CMC airfoil wall has first and second wishbone-shaped fiber layup structures. Each of the first and second wishbone-shaped fiber layup structures have first and second arms that merge into a single leg. The first and second arms are comprised of a network of fiber tows. The single leg has fiber tows from each of the first and second arms that are interwoven in the single leg. The single leg forms a portion of the root, and the first and second arms extend in opposite directions from the single leg and form a portion of the platform.

In a further embodiment of any of the foregoing embodiments, the first arm of the first wishbone-shaped fiber layup structure extends axially forwardly from the single leg of the first wishbone-shaped fiber layup structure, and the first arm of the second wishbone-shaped fiber layup structure extends axially aftly from the single leg of the second wishbone-shaped fiber layup structure.

In a further embodiment of any of the foregoing embodiments, the second arm of the first wishbone-shaped fiber layup structure extends axially aftly from the single leg of the first wishbone-shaped fiber layup structure, and the second arm of the second wishbone-shaped fiber layup structure extends axially forwardly from the single leg of the second wishbone-shaped fiber layup structure.

In a further embodiment of any of the foregoing embodiments, a tip of the second arm of the first wishbone-shaped fiber layup structure is adjacent a tip of the second arm of the second wishbone-shaped fiber layup structure to define a gap therebetween.

In a further embodiment of any of the foregoing embodiments, the CMC airfoil wall includes radially inner and outer reinforcement fiber plies between which the second arm of the first wishbone-shaped fiber layup structure and the second arm of the of the second wishbone-shaped fiber layup structure are disposed, and the radially inner and outer reinforcement fiber plies each bridge the gap.

In a further embodiment of any of the foregoing embodiments, the single leg of the first wishbone-shaped fiber layup structure defines an axially forward face of the root, and the single leg of the second wishbone-shaped fiber layup structure defines an axially aft face of the root.

In a further embodiment of any of the foregoing embodiments, the second arm of each of the first and second wishbone-shaped fiber layup structure splits into a pair of fingers, and the airfoil section extends between the pair of fingers.

A gas turbine engine according to an example of the present disclosure includes a compressor section, a combustor in fluid communication with the compressor section, and a turbine section in fluid communication with the combustor. The turbine section has and airfoil as in any of the foregoing embodiments.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
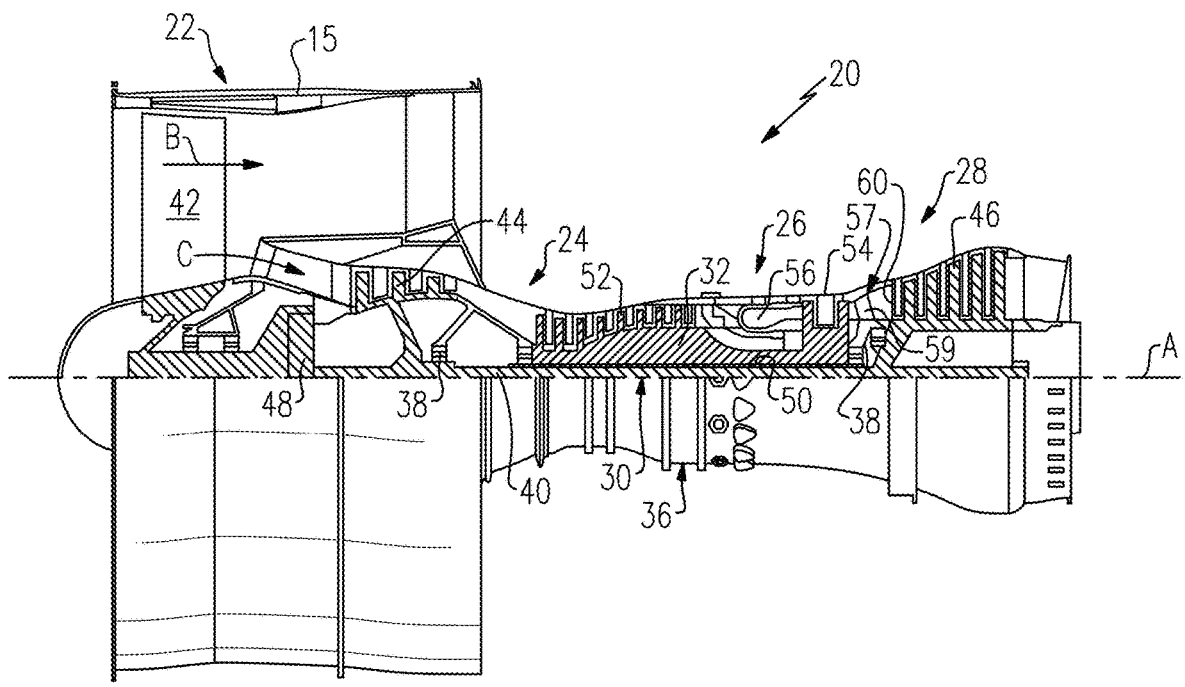
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/see divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
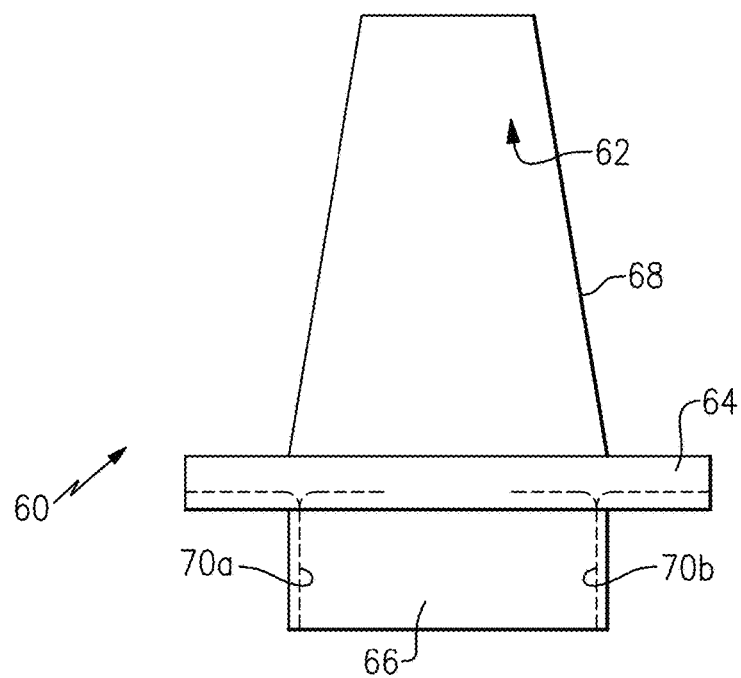
FIG. 2 illustrates an airfoil from the turbine section of the engine.

FIG. 2 illustrates an airfoil 60 from the turbine section of the engine 20 and, in particular, a turbine blade. The blade is rotatable about the engine axis A, although it is to be understood that the examples herein are also applicable to static vanes. The airfoil 60 is generally formed of a ceramic matrix composite (CMC) airfoil wall 62. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC is silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. The ceramic fibers are provided in tows that are in an ordered arrangement in fiber plies or layers.

The wall 62 defines several sections, including a platform 64, a root 66 that extends radially inwardly from the platform 64, and an airfoil section 68 that extends radially outwardly from the platform 64 opposite the root 66. The root 66 has a fir-tree profile to enable interlock with a corresponding slot in a turbine disk to mount and support the blade. The profile may be provided by the geometry of the fiber plies that are laid-up to form the airfoil 60 and/or machined after densification of the airfoil 60 with the ceramic matrix.

Designing a CMC turbine blade with an integral CMC platform is difficult structurally and difficult to fabricate. Structurally, the strength of a CMC typically cannot withstand unsupported regions experiencing a pull load from rotation within an engine. The load on unsupported regions leads to bending, resulting in delamination for interlaminar regions or fiber fracture for in-plane regions. For fabrication, the surfaces available for bonding the platform to the turbine blade that avoid the turbine disk are limited and restrictive. Additionally, the small scale of turbine blades adds complexity, as CMC structures are fabricated by hand. The construction of the airfoil 60 facilitates addressing these challenges.

Figure 3:
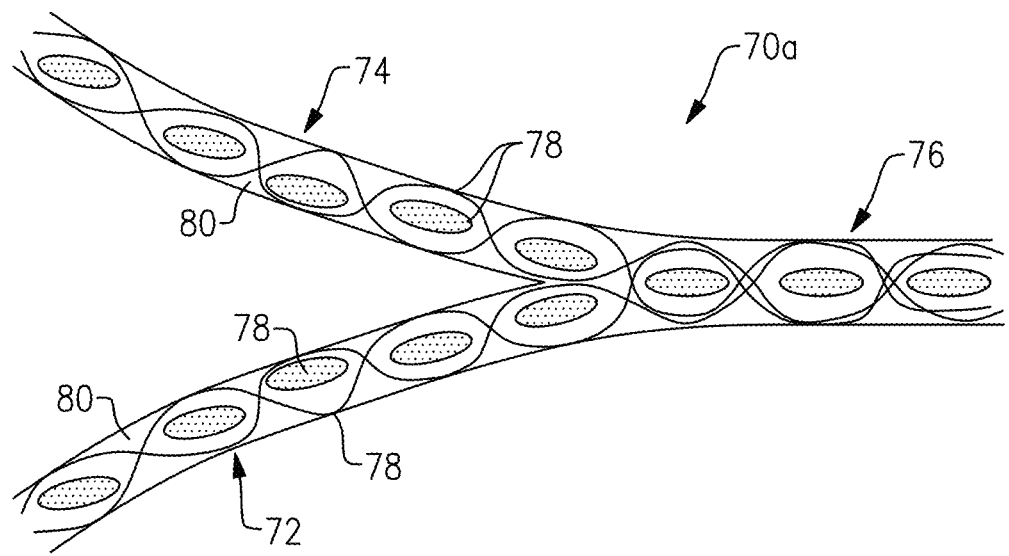
FIG. 3 illustrates a fiber tow configuration of a wish-bone shaped fiber layup structure.

The wall 62 includes at least one wishbone-shaped fiber layup structure, such as the two wishbone-shaped fiber layup structures 70a/70b. An example of the wishbone-shaped fiber layup structure 70a is shown in isolated view in FIG. 3 but it is to be understood that the wishbone-shaped fiber layup structure 70b is of the same configuration. The term "wishbone-shaped" refers to the resemblance of each of the structures 70a/70b to a wishbone that has a leg and two arms that extend from an end of the leg to form a "V." Each of the wishbone-shaped fiber layup structures 70a/70b includes a pair of arms 72/74 that merge into a single leg 76. Each of the arms 72/74 is comprised of a network (e.g., a weave) of fiber tows 78 that are disposed in a matrix material 80 (both represented schematically). It is to be understood that although the network of fiber tows 78 is shown with a particular weave pattern, that other weave patterns may be used. The arms 72/74 merge to form the single leg 76. In that regard, fiber tows 78 from each of the arms 72/74 merge together and are interwoven in the single leg 76. Thus, once merged, the arms 72/74 cease to be distinct from each other and there are no interlaminar interfaces in the single leg 76.

Figure 4:
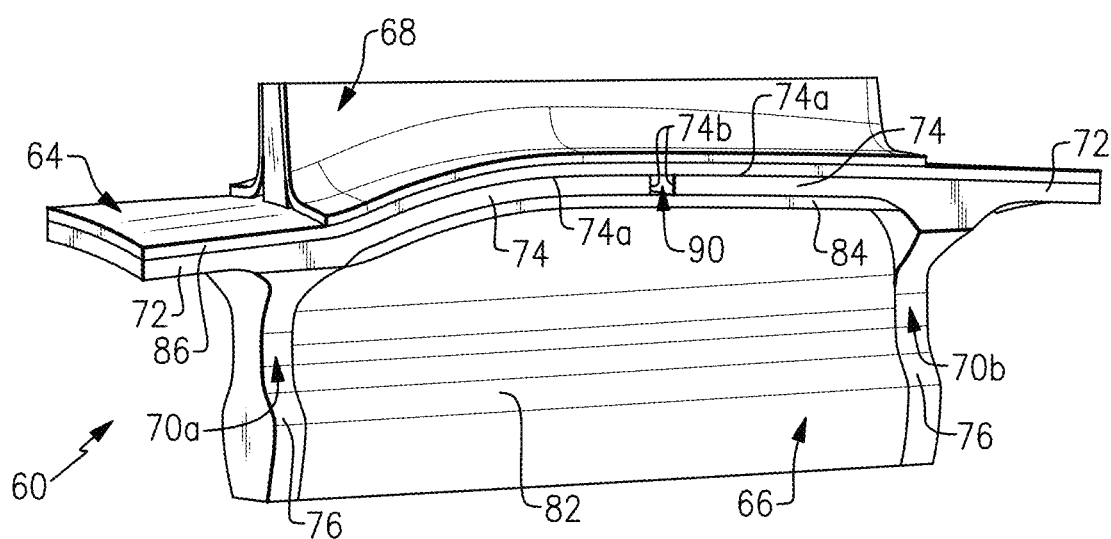
FIG. 4 illustrates a fiber ply architecture of the airfoil.
Figure 5A:
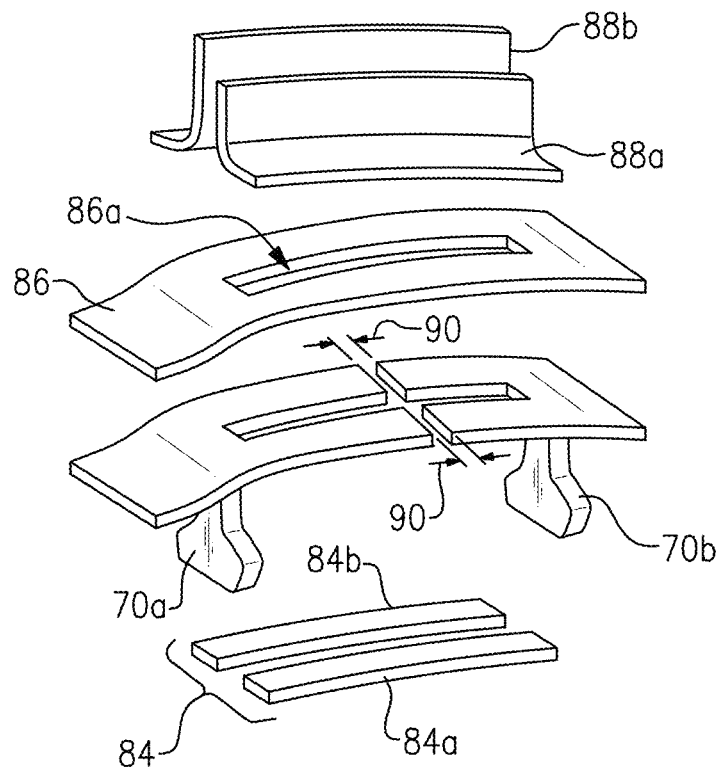
FIG. 5A illustrates an expanded view of a fiber ply architecture.
Figure 5B:
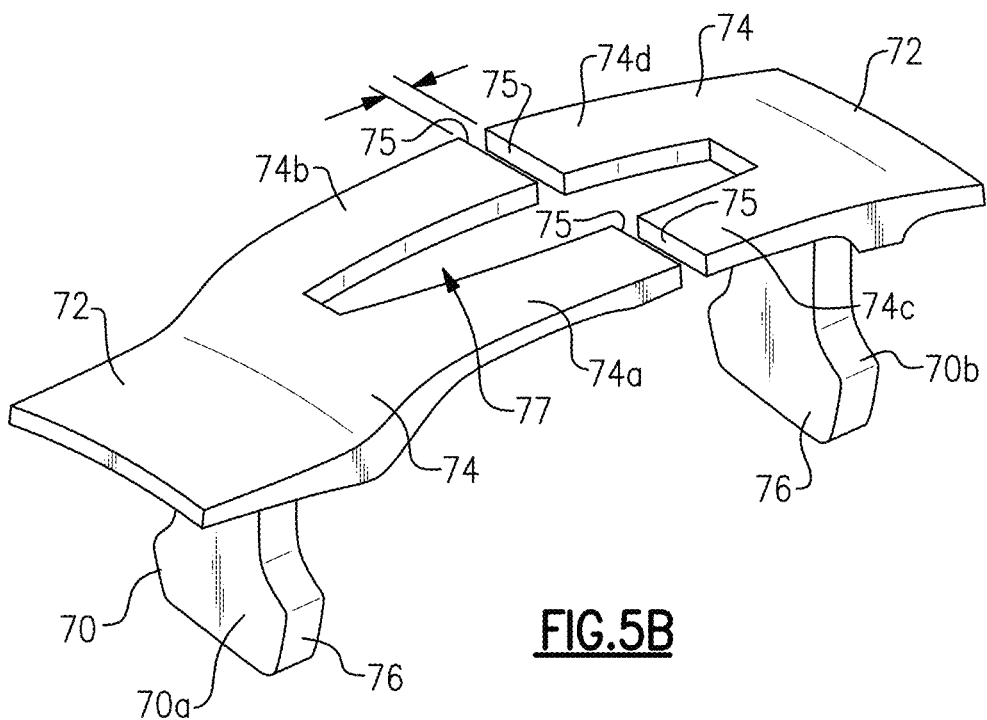
FIG. 5B illustrates an isolated view of wishbone-shaped fiber layup structures.

FIG. 4 shows the fiber ply layup structure of the airfoil 60. In this example, the airfoil 60 includes a core piece 82. The core piece 82 may itself be formed of a layup of fiber plies, a 3D weave, or a monolithic ceramic, but fiber structures contribute to a higher strength that is desirable in a blade in which there will be centrifugal forces. The core piece 82 extends from the root 66, through the platform 64, and into the airfoil section 68. The other fiber plies of the layup structure are built-up around the core piece 82. The wishbone-shaped fiber layup structures 70a/70b are located at the axial faces of the root 66 of the airfoil 60. In particular, the single leg 76 of structure 70a forms the forward axial face of the root 66 while the single leg 76 of the structure 70b forms the aft axial face of the root 66. The arms 72/74 extend in opposite axial directions from the single leg 76 and form a portion of the platform 64. Referring to an expanded view of the airfoil 60 in FIG. 5A without the core piece 82 and the isolated view of the structures 70a/70b in FIG. 5B, the first arm 72 of each structure 70a/70b extends axially beyond the edge of the airfoil section 68, while the second arm 74 of the structure 70a splits into a pair of fingers 74a/74b and second arm 74 of the structure 70b splits into a pair of fingers 74c/74d. The fingers 74a/74b/74c/74d define an opening 77 through which the core piece 82 extends such that the pair of fingers 74a/74b and the pair fingers 74c/74d each straddle the core piece 82 (once assembled).

The CMC airfoil wall 62 further includes radially inner and outer reinforcement fiber plies 84/86 between which the second arm 74 is disposed. The radially inner reinforcement ply 84 is split into two sections 84/84b, one on the pressure side of the platform 64 and one on the suction side of the platform 64, that each terminate at the single leg 76 of the respective structures 70a/70b. Optionally, the radially outer reinforcement ply 86 may also be split into two sections and additional overlay plies may be provided on the plies 84/86. The reinforcement fiber plies 84/86 serve to entrap the second arm 74 of each of the structures 70a/70b and thereby hold the structures 70a/70b in place on the core piece 82 via a double-shear interface, with the inner reinforcement fiber ply 84 bonded on the inner surface of the second arms 74 and the outer reinforcement fiber ply 86 bonded on the outer surface of the first and second arms 72/74. In this example, there is a single outer reinforcement fiber ply 86 that spans the axial faces of the platform 64 and is axially co-extensive with the outer surface of the first arms 72. The outer reinforcement fiber ply 86 has a slot 86a through which the core piece 82 extends. Also in this example there are airfoil pressure and suction side face plies 88a/88b on the pressure and suction sides, respectively, of the airfoil section 68 that serve to provide a smooth aerodynamic surface and a smooth transition filet between the airfoil section and the platform 64.

The first arm 72 of the first wishbone-shaped fiber layup structure 70a extends axially forwardly from the single leg 76 of the first wishbone-shaped fiber layup structure 70a, the first arm 72 of the second wishbone-shaped fiber layup structure 70b extends axially aftly from the single leg 76 of the second wishbone-shaped fiber layup structure 70b, the second arm 74 of the first wishbone-shaped fiber layup structure 70a extends axially aftly from the single leg 76 of the first wishbone-shaped fiber layup structure 70a, and the second arm 74 of the second wishbone-shaped fiber layup structure 70b extends axially forwardly from the single leg 76 of the second wishbone-shaped fiber layup structure 70b.

With such an orientation, the fingertips 75 of the fingers 74a/74b of the first wishbone-shaped fiber layup structure 70a are adjacent the fingertips 75 of the fingers 74c/74d of the second wishbone-shaped fiber layup structure 70b to define a gap 90 therebetween. The radially inner and outer reinforcement fiber plies 84a/84b/86 each bridge the gap and thereby structurally tie the wishbone-shaped fiber layup structures 70a/70b together to reinforce the platform 64 of the airfoil 60. The single legs 76 of the wishbone-shaped fiber layup structures 70a/70b, which extend into the root 66 and thus enable forces in the platform to be reacted out from the root 66, which facilitates reinforcing the platform 64 that would otherwise be unsupported as a cantilevered structure.

Figure 6:
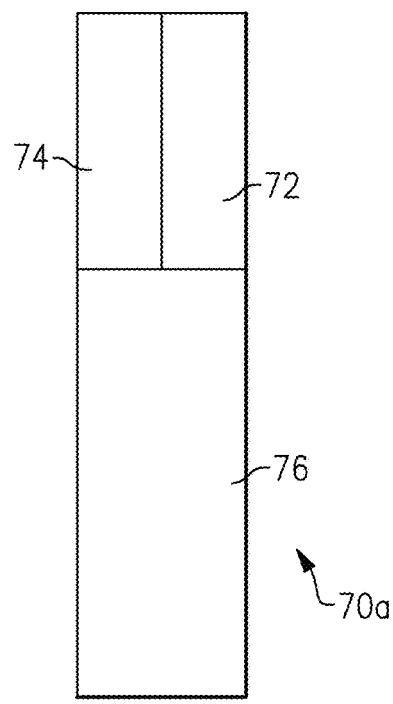
FIG. 6 illustrates a wish-bone shaped fiber fabric during processing to make an airfoil.
Figure 7:
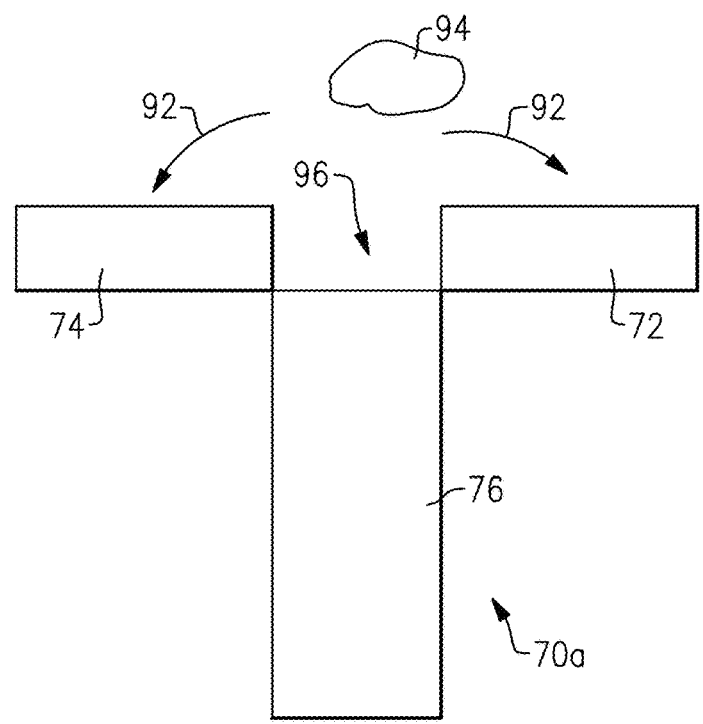
FIG. 7 illustrates the fabric after being folded.

FIG. 6 illustrates the wishbone-shaped fiber layup structure 70a (or alternatively 70b) prior to densification, during the layup process to make the airfoil 60. Initially, the wishbone-shaped fiber layup structure 70 is provided as a fabric in which the arms 72/74 are generally in-plane with the single leg 76. As shown by arrows 92 in FIG. 7, the arms 72/74 are then folded in opposite directions toward the single leg 76. A filler material 94, such as a fibrous noodle, may be provided in the void region 96 left between the arms 72/76 from folding them apart. The folded fabric is then laid up on the core piece 82, along with the radially inner and outer reinforcement fiber plies 84a/84b/86 and airfoil pressure and suction side face plies 88a/88b to form a fiber preform. The second arm 74 may be cut prior to layup to provide the fingers 74a/74b (or 74c/74d for structure 70b). The preform is then subjected to a densification process to form the ceramic matrix. Such a densification process may include, but is not limited to, chemical vapor infiltration, melt infiltration, or polymer infiltration and pyrolysis.

The buttresses being formed from the 3D weave of the single leg 76 causes the bending stresses of the unsupported regions of the platform 64 to manifest as in-plane stresses, which has greater capability than interlaminar tensile or interlaminar shear. The fir-tree shape machined into the root 66 allows for pull load to be reacted at the disk contact face. This manifests as in-plane stresses in the 3D woven single leg 76 instead of solely relying on the less-capable interlaminar shear joint against the blade root forward and aft faces. Multi-piece CMC preform layup with the plurality of reinforcing shear plies facilitates fabrication without a reduction of capability, as the fiber plies interlock and, in essence, mechanically act as a single-piece construction. Placement of bonded interfaces between fiber plies facilitates machining in critical areas, further improving manufacturability. The folded construction of the wish-bone shaped fiber structure also mitigates difficulties that would otherwise be present at the small scale of a turbine blade if created with 2D woven plies.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
a ceramic matrix composite (CMC) airfoil wall defining a platform, a root extending radially from the platform, and an airfoil section extending radially from the platform opposite the root, the CMC airfoil wall including first and second wishbone-shaped fiber layup structures,
each of the first and second wishbone-shaped fiber layup structures including:
first and second arms that merge into a single leg,
the first and second arms being comprised of a network of fiber tows,
the single leg including fiber tows from each of the first and second arms that are interwoven in the single leg, the single leg forming a portion of the root, and
the first and second arms extending in opposite directions from the single leg and forming a portion of the platform, wherein
the first arm of the first wishbone-shaped fiber layup structure extending axially forwardly from the single leg of the first wishbone-shaped fiber layup structure, and the first arm of the second wishbone-shaped fiber layup structure extends axially aftly from the single leg of the second wishbone-shaped fiber layup structure,
the second arm of the first wishbone-shaped fiber layup structure extends axially aftly from the single leg of the first wishbone-shaped fiber layup structure, and the second arm of the second wishbone-shaped fiber layup structure extends axially forwardly from the single leg of the second wishbone-shaped fiber layup structure, and
a tip of the second arm of the first wishbone-shaped fiber layup structure is adjacent a tip of the second arm of the second wishbone-shaped fiber layup structure to define a gap therebetween.

2. The airfoil as recited in claim 1, wherein the CMC airfoil wall includes radially inner and outer reinforcement fiber plies between which the second arm of the first wishbone-shaped fiber layup structure and the second arm of the of the second wishbone-shaped fiber layup structure are disposed, and the radially inner and outer reinforcement fiber plies each bridge the gap.

3. The airfoil as recited in claim 2, wherein the single leg of the first wishbone-shaped fiber layup structure defines an axially forward face of the root, and the single leg of the second wishbone-shaped fiber layup structure defines an axially aft face of the root.

4. The airfoil as recited in claim 1, wherein the second arm of each of the first and second wishbone-shaped fiber layup structure splits into a pair of fingers, and the airfoil section extends between the pair of fingers.

5. A gas turbine engine comprising:
a compressor section;
a combustor in fluid communication with the compressor section; and
a turbine section in fluid communication with the combustor, the turbine section having and an airfoil including:
a ceramic matrix composite (CMC) airfoil wall defining a platform, a root extending radially from the platform, and an airfoil section extending radially from the platform opposite the root, the root having a fir-tree profile, the CMC airfoil wall including first and second wishbone-shaped fiber layup structures,
each of the first and second wishbone-shaped fiber layup structures including:
first and second arms that merge into a single leg,
the first and second arms being comprised of a network of fiber tows,
the single leg including fiber tows from each of the first and second arms that are interwoven in the single leg, the single leg forming a portion of the root, and
the first and second arms extending in opposite directions from the single leg and forming a portion of the platform, the first arm of the first wishbone-shaped fiber layup structure extending axially forwardly from the single leg of the first wishbone-shaped fiber layup structure, the first arm of the second wishbone-shaped fiber layup structure extending axially aftly from the single leg of the second wishbone-shaped fiber layup structure, the second arm of the first wishbone-shaped fiber layup structure extending axially aftly from the single leg of the first wishbone-shaped fiber layup structure, and the second arm of the second wishbone-shaped fiber layup structure extending axially forwardly from the single leg of the second wishbone-shaped fiber layup structure, and a tip of the second arm of the first wishbone-shaped fiber layup structure is adjacent a tip of the second arm of the second wishbone-shaped fiber layup structure to define a gap therebetween.

6. The gas turbine engine as recited in claim 5, wherein the CMC airfoil wall includes radially inner and outer reinforcement fiber plies between which the second arm of the first wishbone-shaped fiber layup structure and the second arm of the of the second wishbone-shaped fiber layup structure are disposed, and the radially inner and outer reinforcement fiber plies each bridge the gap.

7. The gas turbine engine as recited in claim 6, wherein the single leg of the first wishbone-shaped fiber layup structure defines an axially forward face of the root, and the single leg of the second wishbone-shaped fiber layup structure defines an axially aft face of the root.

8. The gas turbine engine as recited in claim 5, wherein the second arm of each of the first and second wishbone-shaped fiber layup structure splits into a pair of fingers, and the airfoil section extends between the pair of fingers.

9. The gas turbine engine as recited in claim 5, wherein the turbine section includes a disk that defines a slot that has a geometry that corresponds to the fir-tree profile such that the root interlocks with the slot.

\* \* \* \* \*